United States Patent [19]

Battis

[11] 4,303,426

[45] Dec. 1, 1981

[54] AUTOMOBILE AIR FILTER HAVING REPLACEABLE AND READILY DISPOSABLE FILTER ELEMENT

[76] Inventor: Robert Battis, 2104 Klockner Rd., Hamilton Square, N.J. 08690

[21] Appl. No.: 130,292

[22] Filed: Mar. 14, 1980

[51] Int. Cl.³ .......................................... B01D 46/52
[52] U.S. Cl. ...................................... 55/498; 55/499; 55/502; 55/510
[58] Field of Search ................................. 55/498–499, 55/501–502, 510

[56] References Cited

U.S. PATENT DOCUMENTS

| | | | |
|---|---|---|---|
| 1,712,947 | 5/1929 | Blair | 55/DIG. 28 X |
| 1,898,027 | 2/1933 | Winslow | 55/510 X |
| 2,331,809 | 10/1943 | Sninsky | 55/510 X |
| 2,732,031 | 1/1956 | Rabbitt et al. | |
| 2,979,159 | 4/1961 | Pritchard et al. | |
| 3,167,416 | 1/1965 | Humbert, Jr. et al. | |
| 3,209,520 | 10/1965 | McKinlay | 55/498 X |
| 3,218,785 | 11/1965 | Tietz | |
| 3,417,551 | 12/1968 | Bonell | 55/498 |
| 3,710,562 | 1/1973 | McKenzie | 55/498 X |
| 3,796,416 | 3/1974 | Knudson | 55/498 X |
| 4,074,985 | 2/1978 | Willas | 55/498 |

FOREIGN PATENT DOCUMENTS 894235 4/1962 United Kingdom .................. 55/510

*Primary Examiner*—Kathleen J. Prunner
*Attorney, Agent, or Firm*—Frederick A. Zoda; John J. Kane; Albert Sperry

[57] ABSTRACT

An air filter, particularly adapted for use in internal combustion engines, eliminates the necessity of discarding the entire air filter when the filter element becomes clogged to the extent that its efficiency is reduced below acceptable levels. The air filter of the invention incorporates a readily removable and replaceable filter element disclosed in a preferred embodiment as an inexpensive length of paper, accordion pleated in a manner to permit it to be folded into a highly compact product until ready for use. In use, the element is extended to partially open the pleats or folds, providing maximum filter area. The element in use is confined in a hollow annular assembly composed of confronting rings preferably of neoprene rubber or its equivalent, and further composed of foraminous retaining elements extending between the rings. Replacement of a filter element is readily achieved by removal of one of the rings, providing access to the filter element chamber. For maximum filtering efficiency, soft, resilient cushions are provided on the confronting faces of the support rings, in which the edges of the filter element become lightly embedded to provide an effective seal along said edges.

6 Claims, 4 Drawing Figures

AUTOMOBILE AIR FILTER HAVING REPLACEABLE AND READILY DISPOSABLE FILTER ELEMENT

BACKGROUND OF THE INVENTION

1. Field of the Invention

The invention relates generally to the art of gas separation, that is to say, the filtering of a gaseous fluid. In a more particular sense the invention relates to filtering means falling within this general category, having a generally annular configuration in which gasketed retaining means are utilized for edge support of non-planar, sheet-like filter elements, especially those of zig-zag or pleated configurations.

2. Description of the Prior Art

In the prior art, efforts have been primarily directed, so far as replaceable filter elements are concerned, to the provision of replaceable cartridges, in which the replacement part includes more than the filter medium or element itself, and may include both the top and bottom support ring, and the inner and outer screens. This is shown, for example, in U.S. Pat. Nos. 2,979,159; 2,732,031; 3,218,785; and 3,167,416.

It would be very desirable, of course, to permit replacement of a filter element at an absolute minimum of expense, without the necessity of discarding any of the retaining or housing means incorporated in the overall filter structure for the purpose of retaining or positioning the filter element. The patents noted above have been directed toward replacing the filter medium along with cooperating retaining parts, and this is considered undesirable. The prior art has been silent, so far as is known, on the concept of retaining all components of the air filter structure considered as a whole, with the exception of the filter element itself. The prior art has failed to suggest a swift and easily practiced mode of providing access to the filter medium without the use of special tools, and permitting replacement of that medium, also without the use of special tools, with maximum ease and speed.

The prior art has further been silent on the provision of a replaceable filter element which, from the point at which it leaves the manufacturer to the time at which it is to be placed in use, may be retained as a compact, small, easily packaged product, in which the filter element comprises an inexpensive strip of paper, folded upon itself to provide a plurality of accordion pleats, and adapted to be compressed or folded flat into a small, highly compact condition while awaiting use.

SUMMARY OF THE INVENTION

Summarized briefly, the invention comprises an air filter adapted to be substituted for air filters (especially those used in automobiles) as now made. The air filter constructed according to the present invention, thus, is of the heretofore conventional annular configuration utilized in most modern day vehicles. It incorporates, in this connection, an annular structure, capable of being clamped in place by the conventional filter cover plate, which is well known is tightened in place by means of a centrally disposed thumb screw or wing nut. In accordance with the invention, the air filter herein disclosed can be substituted for those now in use, and has a distinct advantage in that no part thereof need be discarded, throughout the life of the vehicle, with the exception of the inexpensive filter element itself. This, in accordance with the present invention, is preferably made of an inexpensive paper pervious to air while still designed to arrest and prevent the passage of solids or other contaminants. The paper itself does not constitute part of the present invention, but rather, the construction wherein the replaceable filter element is normally compressed flat, in a folded condition, while awaiting use, and can be swiftly opened into a generally annular configuration, retaining a zig-zag or accordion pleated form when so opened. In accordance with the invention, the old element can be removed and a new one swiftly substituted therefor, merely by removal of the conventional cover plate, followed by removal of the top ring of the air filter constituting the present invention. This provides access to the filter chamber, allowing one to merely remove the old, clogged element and swiftly replace the same with a fresh filter element. The support ring which has been removed can now be readily returned to place, and the cover plate is again clamped to hold the parts together.

In accordance with the invention, efficient air filtering is achieved in the assembled device, through the provision of soft, foam rubber cushions or gaskets, in which the opposite longitudinal edges of the filter element become lightly embedded responsive to assembly of the several parts of the air filter. This prevents the passage of air into the internal combustion engine, along any path other than the designed path in which the air is required to pass directly through the filtering element itself.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DESCRIPTION OF THE PREFERRRED EMBODIMENT

Figure 1:
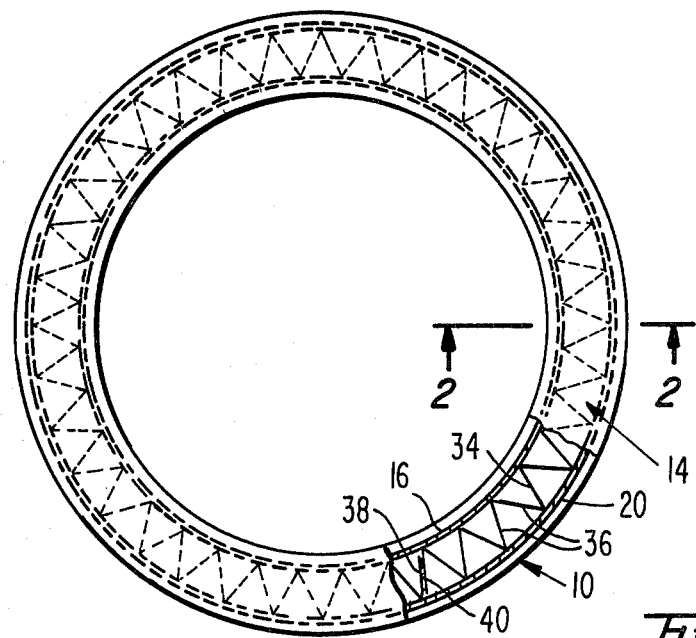
FIG. 1 is a plan view of an automobile air filter constructed according to the present invention, in which a portion has been broken away to show details of the internal construction.

The automobile air filter constituting my invention has been generally designated 10 in the drawing, and is here disclosed as including first and second support rings 12, 14 respectively. In a preferred embodiment, these are formed as flat, wide, annular members disposed in spaced, parallel relation, and would be formed of a molded, high-impact, heat-resistant material, such as neoprene rubber having, additionally, desirable qualities of resistance to airborne contaminants whether they be of a liquid, gaseous, or particulate form.

The rings are continuous through their entire circumferences, and are designed to be clamped between conventional retaining plates, not shown, of a conventional automobile engine.

Extending between and retained in place by the rings 12, 14, are an inner screen element 16 preferably formed of a foraminous thin sheet metal material having apertures 18, and an outer screen element 20 formed of similar material and having a apertures 22. These screen elements are transversely spaced, cooperating with the support rings 12, 14 in defining a continuous, annular filter element chamber 23.

In the manufacture of the filter 10, the screen elements 16, 20 are preferably formed with perforated bottom edges 24, which are permanently and fixedly embedded in the material of the first support ring 12, during the molding of the ring. Any suitable means can be employed, other than perforations in the bottom edges 24, for the purpose of assuring that the metal screen elements will be securely embedded in the material of the ring 12. The provision of small perforations, into which the rubber material of the ring may flow during the molding operation, is merely one expedient that can be employed. Alternatively, the bottom edges of the screen element might be lipped, flanged, or toothed, to accomplish the same result, this being considered sufficiently obvious as not to require special illustration.

The upper longitudinal edges of the screen elements 16, 20, however, are not permanently embedded in the material of the support ring 14. Rather, it is part of the present invention that the ring 14 be readily disengaged from the metal screen elements, in the manner shown to particular advantage in FIG. 4. To this end, the upper edges of the screen elements, viewing the same as in the drawing, may be folded as at 26, 28 respectively, to facilitate their entry into concentric grooves 30 of the support ring 14. The folded upper edges 26, 28 of the screen elements 16, 20, when the air filter is completely assembled as in FIG. 2, are snugly received in the grooves, and it will be understood that upon replacement of the removable filter clamping plate, not shown, conventionally provided as a retaining means for the air filter per se, the screen element will be securely engaged in the grooves of the support ring 14.

Figure 2:
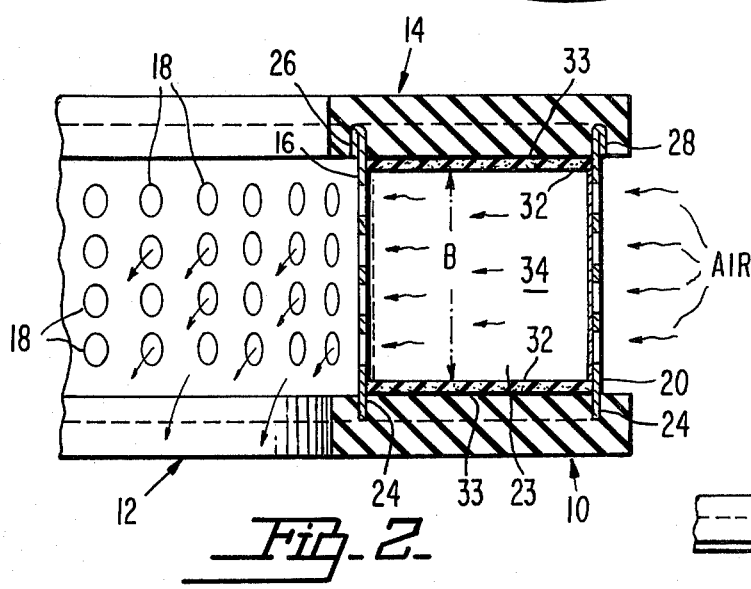
FIG. 2 is an enlarged, transverse, fragmentary sectional view substantially on line 2—2 of FIG. 1.
Figure 4:
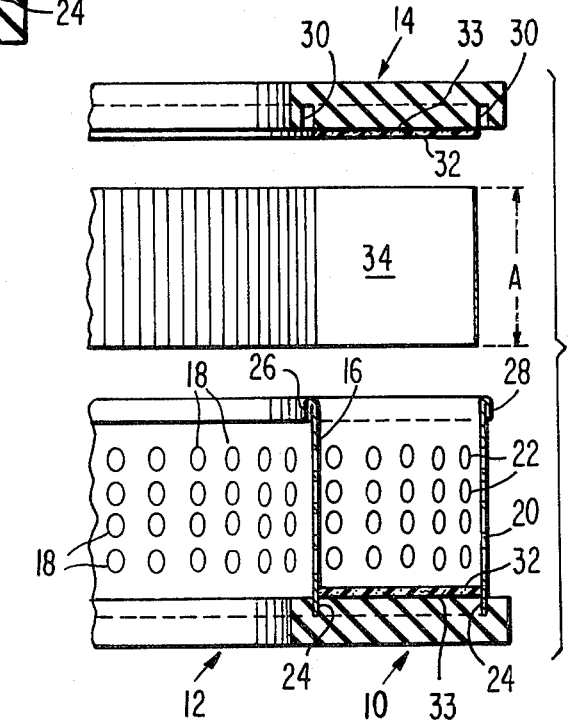
FIG. 4 is a detailed, enlarged sectional view on the same cutting plane as FIG. 2, partially exploded so as to show the manner in which a filter element may be replaced.

It is also to be noted that I provide, on each of the support rings, a flat, soft, resilient, filter element gasket, and as will be seen from FIGS. 2 and 4, the gaskets, which have been designated 32, extend the full distance between the upper and lower edge portions of the screen elements. These gaskets or pads are permanently secured to the confronting faces of the rings 12, 14, over the full width of the filter element chamber 23, by means of adhesive 33 or other suitable bonding material.

The material of the gaskets should be selected so as to be heat resistant, and in general, so as to have the same basic qualities as the support rings themselves.

Figure 3:
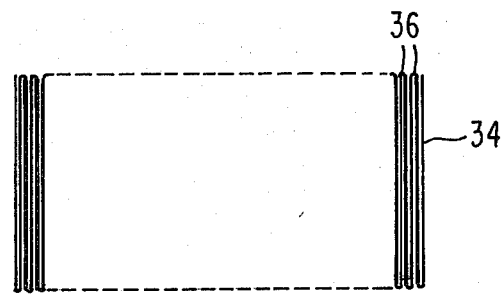
FIG. 3 is a side elevational view of the filter element per se, as it appears when folded flat, ready for use.

Designated at 34 is a replaceable filter element, which as shown in FIG. 3, would be folded so as to be capable of being packaged as a small shelf item. The filter element 34 is formed of a paper pervious to the passage of air while yet being adapted to arrest and prevent the passage of those particulates or other contaminants that are to be denied admission to the combustion chambers of the engine. Material of this type is already well known, and need not be further described herein. It is sufficient to note, for the purposes of the present invention, that the filter element is accordion pleated as shown in FIG. 3, so that when ready for use, it can be pulled open, and given the shape of a generally annular member (see FIG. 1), having a zig-zag form through its entire length. The filter element can thus be formed of a strip of paper, of a suitable length, folded into the pleated configuration illustrated.

In use, the support ring 14 is readily removed, as shown in FIG. 4, to provide access to the filter element chamber 23. The old, clogged, ineffective filter element, not shown, is now removed, and a fresh element 34 is substituted therefor, again in the manner shown in FIG. 4. All that is necessary is that the open filter element be inserted into the chamber 23. When it is inserted in the opened condition illustrated in FIGS. 1 and 4, the ring 14 is returned to its FIG. 2 position. In these circumstances, the accordion pleats 36 of the partially opened filter element will be disposed in position to filter air passing through the filter element, and will provide a desirably large filtering area in relation to the circumference of the filter itself.

It may be desirable to overlap the ends of the filter element as shown at 38. This overlapping can extend for as many folds as desired, and it will be understood that if the overlapped area 38 extends through perhaps two or three folds, there will be little or no possibility of air passing between the overlapped ends in a manner that would prevent proper filtering of that air. However, if it is desired to facilitate the assembly of the partially unfolded filter element into its prescribed annular, partially opened form, the overlapped areas 38 can be predetermined by the provision of adhesive 40 thereon, which adhesive would normally be protected by a removable backing paper, not shown. Upon removal of the backing paper, the overlapped, adhesively coated ends can be connected in face to face relation to provide a continuous, zig-zag filter element 34, ready for use and formed to the exact circumference or length needed for use in the particular filter 10 illustrated.

Yet another possibility is that the ends of the filter element may be adhesively joined or otherwise connected by the manufacturer.

When the several parts of the filter are reassembled, in the manner shown in FIG. 2, the longitudinal edge of the filter element 34 bed down slightly into the confronting faces of the soft sponge rubber gaskets or pads 32. To this end, the transverse dimension A of the filter element itself is selected to be slightly greater than the height B of the filter chamber 23 as measured between the confronting faces of the uncompressed gaskets or pads 32. This causes the edges of the filter element to be sealingly engaged in the material of the respective gaskets, when the air filter is completely reassembled in the manner shown in FIG. 2, following removal of the old filter element and replacement thereof by the new one.

It will be seen that the arrangement illustrated and described permits all parts of the air filter to be retained, permanently, thus saving the user considerable expense. Heretofore, it has sometimes been necessary to replace the entire filter ring assembly, or it has at least been necessary to replace a filter cartridge with a new one. This has involved the discarding of metal, rubber, or other components, which is highly undesirable considering the need for conserving materials under present day conditions. Further, the expense involved in discarding components that in and of themselves might still be usable, is of course undesirable and should be avoided wherever possible. To this end, the only part that is replaced is the highly inexpensive paper filter element itself. All other parts are retained permanently.

Another important advantage in the invention is seen in the added incentive that a typical car owner will have to replace filter elements more frequently than is true at this time. Since he need purchase only a very inexpensive filter element, and will be able to replace it himself without needing the services of a service station or garage owner, he will be encouraged to make such replacements more often. The result is that this will promote savings in fuel. It is well-known that if one changes air filters frequently, he will maintain his engine at a higher-than-normal operating level, over a longer period of time, so far as fuel efficiency is concerned. This, of course, is obviously a matter of great importance in light of the high cost of automobile fuel and the great importance of conserving fuel to the maximum extent.

While particular embodiments of this invention have been shown in the drawings, and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An air filter comprising:
   (a) an annular filter element retaining assembly having an annular filter element chamber, a portion of said assembly being removable to provide access to said chamber; and
   (b) a filter element seating in said chamber, said element being insertable and removable through the area of said assembly normally occupied by the removable portion thereof,
   said assembly including confronting, flat, annular support rings and a pair of concentric, annular screen elements extending between said rings and cooperating therewith to form an annular filter element chamber of rectangular cross-section, one of said rings comprising the removable portion of the filter element retaining assembly, the screen elements being permanently secured along one edge thereof to the other one of said rings, said one ring having a pair of annular grooves opening toward the other ring, said grooves being concentric with and radially spaced correspondingly to the screen elements, said other edges of the screen elements being snugly and removably seated in said grooves, whereby to facilitate removal of said portion of the filter element retaining assembly.

2. An air filter as in claim 1, further including soft, resilient sealing gaskets carried by the respective rings and extending substantially the full transverse dimension within the chamber between the screen elements, said filter element having opposed edges thereof bedded sealably in the respective gaskets.

3. An air filter as in claim 2 wherein the filter element has a transverse dimension slightly in excess of the distance within the chamber measured between confronting faces of the gaskets in the uncompressed condition of the gaskets, whereby to cause the opposed edges of the filter element to bed in the material of the gaskets.

4. An air filter as in claim 3 wherein said other edges of the screen elements are folded over upon themselves, the width of the grooves being substantially equal to the thickness of the folded edges to provide for the snug seating of said other edges in their associated grooves.

5. An air filter as in claim 2 in which said rings have confronting faces to which the sealing gaskets are adhesively permanently secured.

6. An air filter comprising:
   (a) a retaining assembly having an annular filter element chamber, a portion of said assembly being removable to provide access to said chamber; and
   (b) a filter element seating in said chamber, said element being insertable and removable through the area of said assembly normally occupied by the removable portion thereof,
   said assembly including confronting, annular support rings and a pair of concentric, annular screen elements extending between said rings and cooperating therewith to form said chamber, one of the rings comprising the removable portion of the assembly, the screen elements being secured along one edge thereof to the other ring, said one ring having a pair of annular grooves opening toward the other ring, said grooves being concentric with and radially spaced correspondingly to the screen elements, said other edges of the screen elements being snugly and removably seated in said grooves, whereby to facilitate removal of said portion of the filter element retaining assembly.

* * * * *

UNITED STATES PATENT AND TRADEMARK OFFICE
CERTIFICATE OF CORRECTION

PATENT NO. : 4,303,426
DATED : December 1, 1981
INVENTOR(S) : Robert Battis

It is certified that error appears in the above-identified patent and that said Letters Patent are hereby corrected as shown below:

Column 3, line 5, delete "a"

Column 4, line 39, change "edge" to --edges--

Signed and Sealed this

Third Day of August 1982

[SEAL]

*Attest:*

*Attesting Officer*

GERALD J. MOSSINGHOFF

*Commissioner of Patents and Trademarks*